Figure 1:
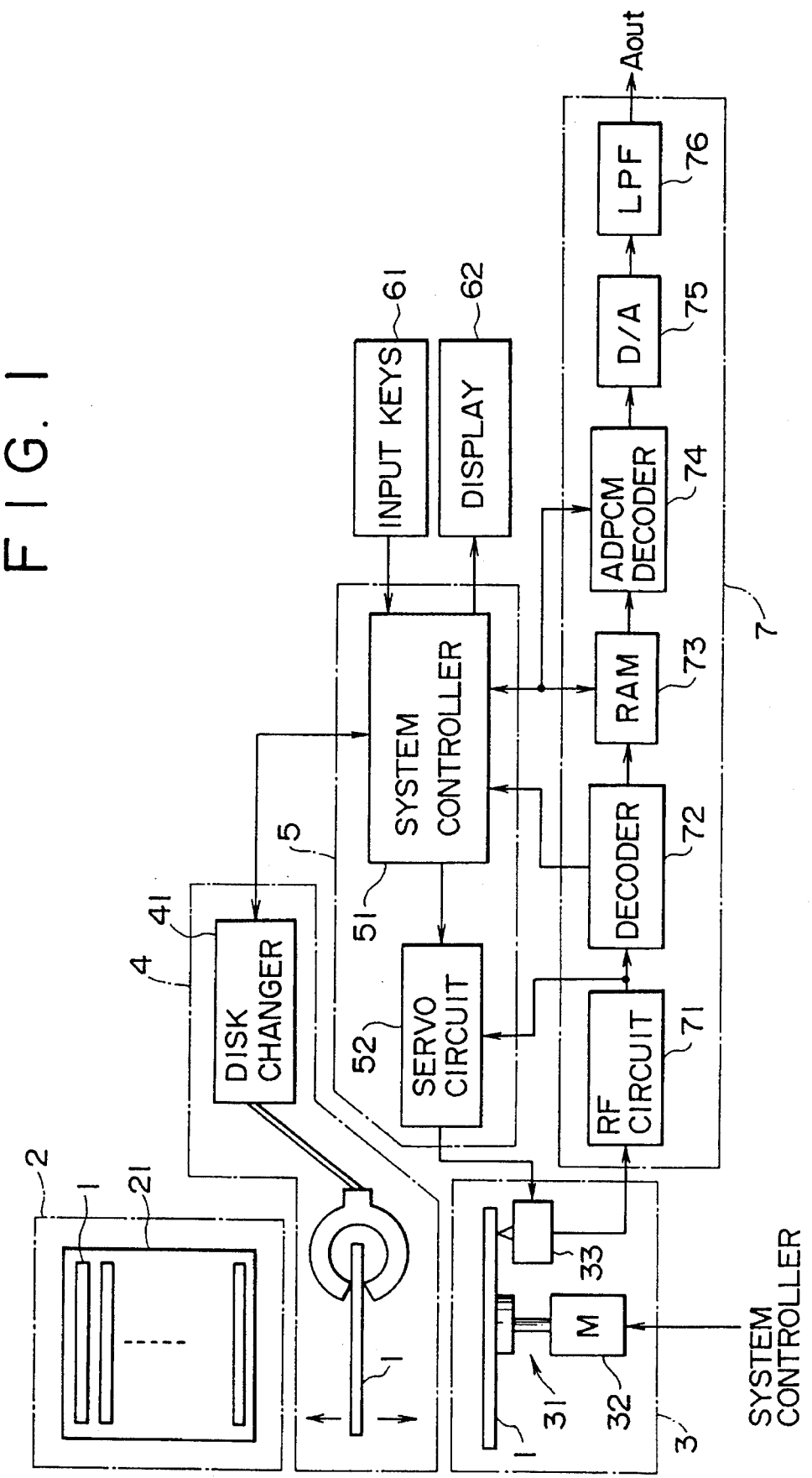

US005559776A

United States Patent [19]

Ikenaga

[11] Patent Number: 5,559,776
[45] Date of Patent: Sep. 24, 1996

[54] DISK PLAYBACK APPARATUS

[75] Inventor: Takashi Ikenaga, Kanagawa, Japan

[73] Assignee: Sony Corporation, Japan

[21] Appl. No.: 607,656

[22] Filed: Feb. 27, 1996

Related U.S. Application Data

[63] Continuation of Ser. No. 430,137, Apr. 26, 1995, abandoned, which is a continuation of Ser. No. 140,241, Oct. 21, 1993, abandoned.

[30] Foreign Application Priority Data

Oct. 26, 1992 [JP] Japan ................... 4-311221

[51] Int. Cl.⁶ ........................................ G11B 7/00
[52] U.S. Cl. ................. 369/47; 369/30; 369/60
[58] Field of Search ..................... 369/32, 44.26, 369/34, 33, 2, 54, 58, 60, 48, 50, 30, 47, 124, 49; 360/61; 364/449

[56] References Cited

U.S. PATENT DOCUMENTS

| | | | |
|---|---|---|---|
| 4,614,474 | 9/1986 | Sudo | 414/281 |
| 4,701,900 | 10/1987 | Hasegawa et al. | 369/36 |
| 4,734,814 | 3/1988 | Fujino et al. | 360/133 |
| 4,755,978 | 7/1988 | Takizawa et al. | 369/37 |
| 4,969,135 | 11/1990 | Tobe | 360/61 |
| 5,036,503 | 7/1991 | Tomita | 369/34 |
| 5,058,096 | 10/1991 | Ando et al. | 369/100 |
| 5,101,357 | 3/1992 | Tempelhof | 364/449 |
| 5,212,678 | 5/1993 | Roth et al. | 369/32 |
| 5,220,545 | 6/1993 | Tomimitsu | 369/32 |
| 5,224,087 | 6/1993 | Maeda et al. | 369/47 |
| 5,224,089 | 6/1993 | Matsumura et al. | 369/124 |
| 5,235,575 | 8/1993 | Han | 369/44.32 |
| 5,257,111 | 10/1993 | Kakuyama | 369/47 |
| 5,345,433 | 9/1994 | Ohga et al. | 369/54 |

FOREIGN PATENT DOCUMENTS

| | | |
|---|---|---|
| 4313177A1 | 10/1993 | Germany . |
| 2-15456 | 1/1990 | Japan ................... 369/124 |
| 2107106B | 4/1983 | United Kingdom . |
| WO92/12515 | 7/1991 | WIPO . |

OTHER PUBLICATIONS

Patent Abstracts of Japan, vol. 15, No. 172 (P–1197) 30 Apr. 1991 & JP–A–03 035 474 (Matsushita Electric Ind., Co., Ltd.), 15 Feb. 1991.
Patent Abstracts of Japan, vol. 16, No. 96 (P–1322), 10 Mar. 1992 & JP–A–03 273 586 (Pioneer Electron Corp.), 4 Dec. 1991.
Patent Abstracts of Japan, vol. 15, No. 382 (P–1257), 26 Sep. 1991 & JP–A–03 150 765 (Sharp Corp.), 27 Jun. 1991.
Patent Abstracts of Japan, vol. 14, No. 269 (P–1059), 11 Jun. 1990 & JP–A–02 076 170 (Mitsubishi Electronic Corp.), 15 Mar. 1990.

*Primary Examiner*—Nabil Z. Hindi
*Attorney, Agent, or Firm*—Limbach & Limbach L.L.P.

[57] ABSTRACT

A disk recording medium playback apparatus wherein a plurality of disks are stored in a magazine, fetched one at a time for reproduction, and the information read from each fetched disk is written to a buffer memory at a higher speed than the speed at which the data is read out from the buffer memory and reproduced, thereby allowing a controlling apparatus enough time to sense by address codes in the reproduced data that reproduction of one disk is finished and that the first disk must be replaced in the magazine and another disk fetched. During replacement of a disk and retrieval of a new disk, data is read out from the buffer memory and reproduced so that there is no interruption of the reproduced data.

4 Claims, 3 Drawing Sheets

DISK PLAYBACK APPARATUS

This is a continuation of application Ser. No. 08/430,137 filed on Apr. 26, 1995 now abandoned. Which is a combination of Application Ser. No. 08/140,241 filed Oct. 21, 1993 now abandoned.

BACKGROUND

1. Field of the Invention

The present invention relates to a playback apparatus and a continuous-playback method for playing back signals from recording media; the playback apparatus and the continuous playback method allow a recording medium to be replaced with another one. In particular, the present invention relates to a playback apparatus and a continuous-playback method employing a facility for replacing a disk recording medium with another one, wherein memory is used for temporarily storing a signal read from the disk recording medium.

2. Background of the Invention

A disk playback apparatus having a disk replacing function has been widely disclosed in documents such as U.S. Pat. Nos. 4,614,474, 4,734,814, 4,701,900 and 4,755,978. In the case of a disk playback apparatus with a disk replacing function, there is much less chance of an optical disk recording medium being touched by hands during replacement. Accordingly, such a disk playback apparatus can well prevent the user from injuring the optical disk or leaving his fingerprints on the optical disk during replacement.

In the disk playback apparatus equipped with such a disk replacing facility, an optical disk is selected by pressing a key among a plurality of optical disks. The selected optical disk is then mounted on a disk playback unit wherein a playback operation is carried out. The disk playback apparatus is so designed that a plurality of optical disks are accommodated in a disk magazine which is mounted on a disk unit. The disk playback apparatus drives a disk replacing mechanism in order to fetch a desired optical disk or a so-called compact disk from the disk magazine. The compact disk fetched from the disk magazine by the disk replacing mechanism is then mounted on the disk playback unit. As the playback operation on the optical disk mounted on the disk playback unit is completed, the disk replacing mechanism removes the optical disk from the disk playback unit and returns it to its original place in the disk magazine. Another optical disk selected by pressing the key or a next optical disk to undergo a playback operation in accordance with information on a playback order programmed in advance is fetched again from the disk magazine and mounted on the disk playback unit. In this way, the playback operation is carried out repeatedly.

In the case of a disk playback apparatus with such a disk replacing function, however, the user cannot identify what optical disks are accommodated in a disk magazine and, thus, what information is stored in the optical disks once the disk magazine has been mounted on the disk playback apparatus unless the user removes the disk magazine out of the disk playback apparatus.

In order to solve the problem described above, a disk playback apparatus, that allows only part of information stored in each optical disk mounted therein to be played back, has been proposed. To be more specific, in the case of a compact disk containing a plurality of songs, only the head portion of each song is played back for a fixed time. For details, refer to a document such as GB-B-2107106 for example.

Even when a disk playback apparatus is equipped with a disk replacing facility as described above, the output signal by the disk playback unit is cut off while a disk is being replaced with another one, inevitably resulting in a mute period of time. In addition, the generation of such a soundless gap cannot be avoided even if the disk playback apparatus having a disk replacing facility is equipped with an additional function for playing back pieces of information stored in an optical disk only for a fixed period of time.

Moreover, in the case of a disk playback apparatus with such a disk replacing function, an optical disk is replaced with another one only after a playback operation carried out by the disk playback unit on the optical disk has been completed. As described above, a next optical disk is fetched from the disk magazine and then mounted on disk playback unit replacing the one that has just completed the playback operation in the disk playback unit. The user has to wait for a long time before the playback operation on the next optical disk can be started.

SUMMARY OF THE INVENTION

It is, therefore, an object of the present invention to provide a disk playback apparatus with a disk replacing facility which resolves the above-mentioned problems.

It is another object of the present invention to provide a continuous-playback method for playing back a plurality of recording media which resolves the above-mentioned problems.

As described above, the disk display apparatus provided by the present invention has a facility for replacing a disk recording medium with another one. The disk playback apparatus is used for reproducing a digital information signal from a disk recording medium in which address information and catalogue information are recorded along with the digital signal. The disk playback apparatus comprises a disk replacing mechanism, a head unit, a decoder, a memory unit, a signal processing unit and a controller. The functions of the disk replacing mechanism are to selectively fetch one of a plurality of disk recording media accommodated in a disk magazine and to return a disk recording medium, completing a playback operation to the disk magazine. The head unit reads information from a disk recording medium selected and fetched by the disk replacing mechanism. The decoder extracts address information from an output signal produced by the head unit, supplying the information to the controller. The memory unit is used for temporarily storing the output signal produced by the head unit before being supplied to the signal processing unit. The signal processing unit processes an output signal read from the memory unit. Receiving the address information from the decoder, the controller controls the operations of the disk replacing mechanism, head unit, the memory unit and the signal processing unit. To be more specific, the controller controls read and write operations of the memory unit in such a way that the speed to write the output signal from the head unit into the memory unit is faster than the speed to read data therefrom. In addition, as the address information supplied from the decoder reaches a predetermined value, the controller supplies a control signal to the disk replacing mechanism, requesting the disk replacing mechanism to replace the current disk recording medium that has completed a playback operation with another one.

The continuous-playback method provided by the present invention for reproducing an information signal and address information from a disk recording medium works as follows. As described above, the disk replacing mechanism first fetches a selected disk recording medium from the disk magazine. The head unit which serves as a read unit reads an information signal and address information from a disk recording unit selected and fetched by the disk replacing mechanism. The memory unit is used for temporarily storing the information signal read by the read unit. The address information read by the read unit along with the information signal is examined to determine whether or not the address information is equal to an end address. If the address information read by the read unit along with the information signal is found equal to the end address, the disk replacing mechanism is requested to replace the current disk recording medium, that has completed a playback operation, with another one. While the current disk recording medium is being replaced with another one, data is continuously read from the memory unit to sustain the playback operation.

According to the present invention, digital data is read from the memory unit while the current disk recording medium is being replaced with another one. The digital data read from the memory unit is supplied to the signal processing unit so as to allow a playback signal to be output continuously without interrupting the output playback signal in the course of the disk replacement. In addition, the operation to return the disk recording medium completing the playback operation and operations required for playing back the replacement disk scheduled for the next playback turn are started at the same time. Accordingly, the time for replacing the current disk recording medium with another one appears to the user to be much shortened.

BRIEF DESCRIPTION OF THE INVENTION

Figure 2:
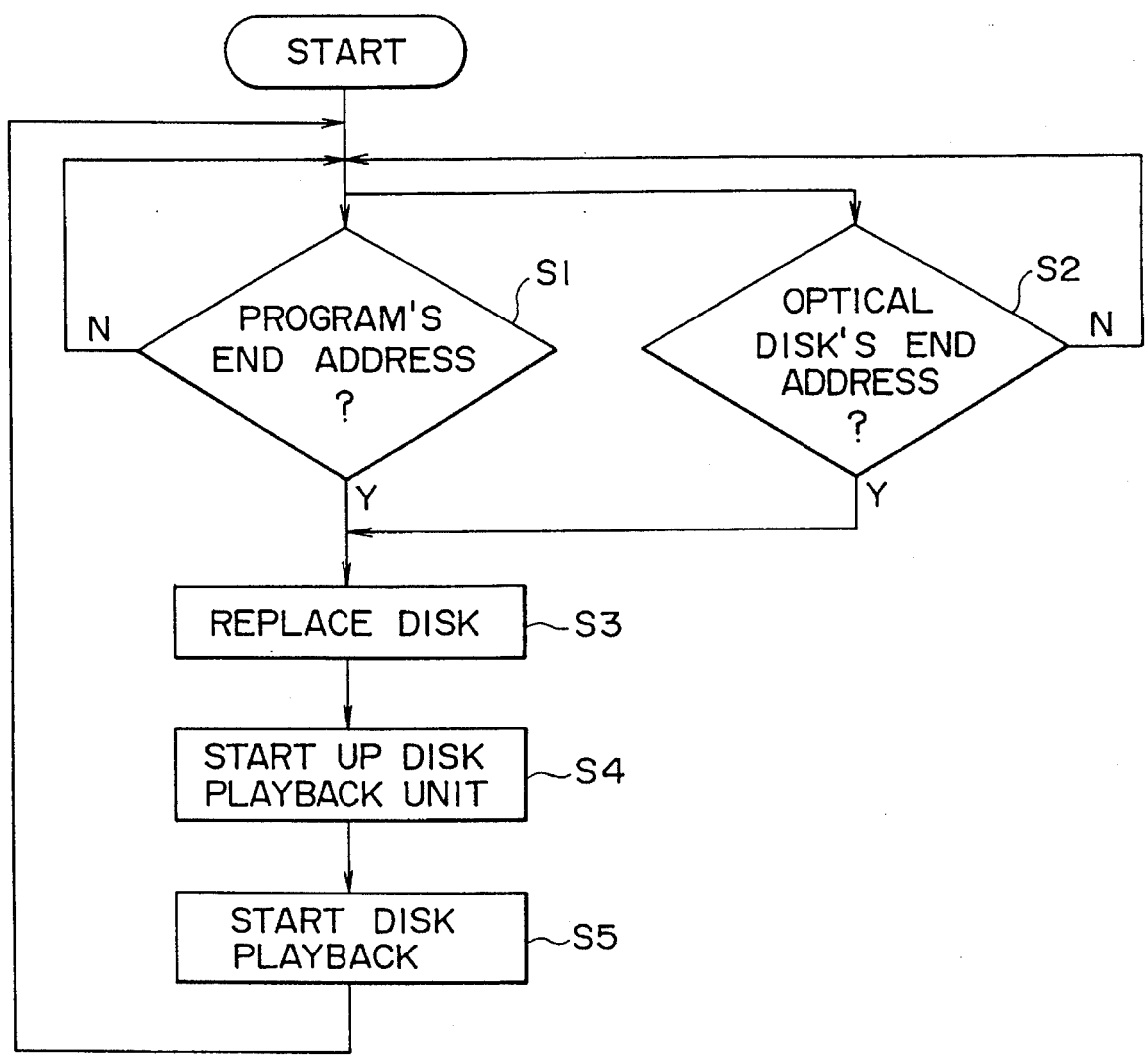
Figure 3:
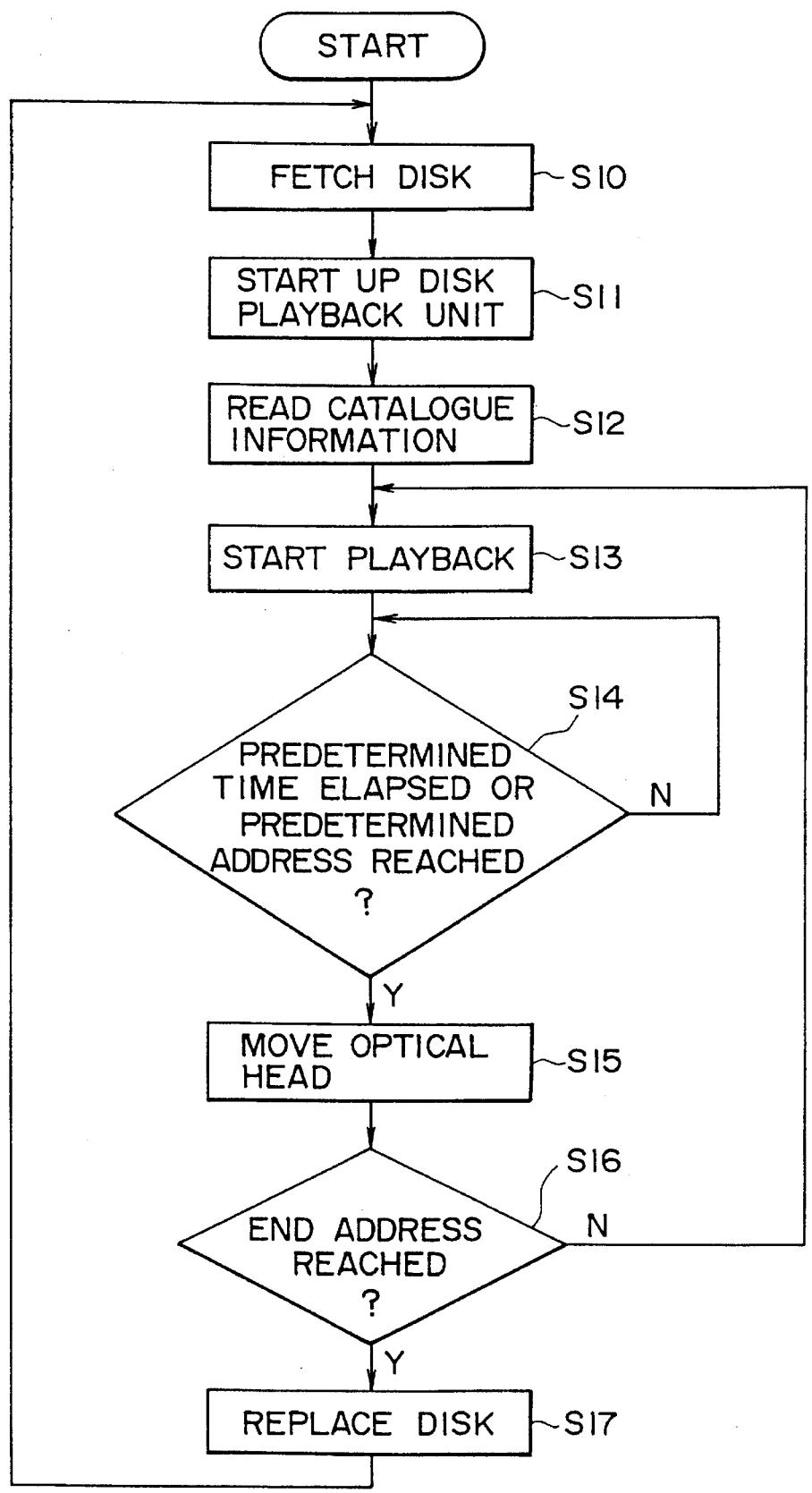

The present invention will be more readily understood by referring to the accompanying drawings, wherein FIG. 1 is a block diagram showing a simplified configuration of a disk playback apparatus equipped with a disk replacing facility provided by the present invention;

FIG. 2 is a flowchart used for explaining an operation to replace a current disk with another one; and FIG. 3 is a flowchart used for explaining an operation to reproduce head information of each program for a predetermined period of time from an optical disk having a plurality of such programs recorded therein.

DESCRIPTION OF THE INVENTION

The following is detailed description of a preferred embodiment implementing a typical disk playback apparatus in accordance with the present invention with reference to the accompanying diagrams. In this typical embodiment, a disk magazine is used for mounting a plurality of optical disks available for selection. Information recorded in a selected optical disk is played back. An optical disk completing a playback operation is replaced with another one according to a desired order which has been programmed in advance.

FIG. 1 is a block diagram showing a simplified configuration of a disk playback apparatus equipped with a disk replacing facility provided by the present invention.

Reference numeral 1 shown in the figure is an optical disk which serves as a recording medium. In addition to a digital signal, address information is also recorded on spiral or concentric recording tracks of the optical disk 1. An example of the address information is information on absolute positions or information on absolute time on the optical disk 1. The digital signal and the address information can be read optically from the recording tracks. The optical disk 1 or the so-called compact disk is also used for recording catalogue information such as a TOC (Table of Contents) of the compact disk. The catalogue information is stored in a region allocated on an inner circumference of the optical disk. The catalogue information includes the number of programs recorded on the optical disk 1 as well as the start and end addresses of each program to mention a few.

Reference numeral 2 denotes a disk mounting unit for mounting a disk magazine 21 which is, in turn, used for accommodating a plurality of optical disk 1. The disk magazine 21 comprises a plurality of accommodating spaces which are each used for accommodating a piece of an optical disk 1. Each accommodating space has an opening for allowing an optical disk 1 accommodated therein to be fetched and mounted therefrom and therein by a disk replacing unit to be described later. Examples of the disk magazine 21 are disclosed in U.S. Pat. Nos. 4,734,814 and 4,701,900.

Reference numeral 3 is a disk playback unit for mounting an optical disk 1 fetched from the disk magazine 21 by the disk replacing unit. The disk playback unit 3 comprises a disk-rotation driving mechanism 31, and an optical head 33. The disk-rotation driving mechanism 31 employs a spindle motor 32 for driving the optical disk 1 into rotation at a constant angular speed or a constant linear speed. The spindle motor 32 has, on the end of a rotation axis thereof, a disk table which is not shown in the figure. An optical disk 1 fetched by the disk replacing unit is mounted on the disk table. The optical head 33 comprises, among other components, a laser-beam source, a beam splitter, a detector and an objective lens. The optical head 33 is moved in the radial direction of the optical disk 1 by a driving mechanism which is also not shown in the figure. An optical beam radiated by the laser-beam source of the optical head 33 is converged by the objective lens and applied to the optical disk 1. An optical beam reflected by the optical disk 1 is separated from the optical beam radiated by the laser-beam source and lead to the detector. An output signal produced by the detector is then supplied to an RF circuit to be described later. In addition, the optical head 33 is also equipped with an actuator for driving the objective lens in focusing and tracking directions. An electromagnetic driving actuator can be typically employed as the actuator. Focusing and tracking servo signals are supplied to a coil of the electromagnetic driving actuator by a servo circuit to be described later.

Reference numeral 4 is the disk replacing unit mentioned above. The elements indicated by reference numerals 21 and 41 together form a "recording media magazine apparatus" or accommodating unit. As described earlier, the disk replacing unit 4 fetches an optical disk 1 from the disk magazine 21 which is placed in the disk mounting unit. The disk replacing unit 4 has a disk changer mechanism 41 for returning an optical disk 1 completing a playback operation to the disk magazine 21. The disk changer mechanism 41 comprises a drawing mechanism for pulling an optical disk 1 out of the disk magazine 21 and a conveying mechanism for transporting the drawing mechanism along with the optical disk 1 pulled out from the disk magazine 21 to the disk playback unit 3. It should be noted that neither the drawing mechanism nor the conveying mechanism is shown in the figure. An optical disk 1 accommodated in the disk magazine 21 is pulled out therefrom by the drawing mechanism through the space opening. The optical disk 1 along with the drawing mechanism are then conveyed to the disk playback unit 3 by the conveying mechanism. The optical disk 1 brought by the conveying mechanism is placed on the disk table of the disk-rotation driving mechanism 31 employed in the disk playback unit 3. After the playback operation carried out by the disk playback unit 3 has been completed, the optical disk 1 and the drawing mechanism are taken back by the conveying mechanism to the position of the disk magazine 21 where the drawing mechanism, this time, performs an operation opposite to the operation to pull out the optical disk 1 off the disk magazine 21, returning the optical disk 1 into its original location in the disk magazine 21. A mechanism disclosed in U.S. Pat. Nos. 4,614,474 and 4,734,814 cited earlier can be used as the disk replacing unit 4.

Reference numeral 5 denotes a control unit which comprises a system controller 51 and a servo circuit 52. The system controller 51 controls the operations of the disk replacing unit 4 and the disk playback unit 3. In addition, the system controller 51 also controls the operation of the signal processing unit to be described later. One of control signals output by the system controller 51 is supplied to the spindle motor 32. Receiving the control signal, the spindle motor 32 drives the optical disk 1, controlling its rotation to a fixed linear speed or a fixed angular speed. Based on a focusing error signal and a tracking error signal supplied by the RF circuit to be described later, the servo circuit 52 generates a focusing servo signal and a tracking servo signal which are supplied to the actuator of the optical head 33. Receiving the focusing and tracking servo signals, the actuator drives the objective lens of the optical head 33 in focusing and tracking directions in the course of focusing and tracking servos respectively. The servo circuit 52 further extracts a low-frequency component out off the tracking error signal. Based on the low-frequency component extracted from the tracking error signal, a driving signal is generated for moving the optical head 33. The optical-head driving signal is then supplied to a driving mechanism of the optical head 33 employed in the disk playback unit 3. The driving mechanism moves the optical head 33 in the radial direction of the optical disk 1 by a distance adjusted to the playback operation of the optical disk 1. An operation input unit 61 and a display unit 62 are connected to the system controller 51. The operation input unit 61 comprises a plurality of keys such as a playback key, a stop key and numeric keys for selecting an optical disk 1. When the user presses one of these keys, a signal associated with the pressed key is supplied to the system controller 51. A combination of the values of pressed keys on the operation input unit 61 forms data which represents a playback order of a plurality of optical disks 1 accommodated in the disk magazine 21 and a playback order of a plurality of programs recorded in each optical disk 1. The data is stored in a memory area of the system controller 51. As for the display unit 62, a liquid-crystal display configuration is typically adopted. A control signal supplied by the system controller 51 is used for outputting information on which optical disk has been selected for a playback operation and information on which program of the selected optical disk is currently undergoing the playback operation. The pieces of information appear on the display unit 62. Based on an instruction entered through the operation input unit 61, the system controller 51 generates a control signal to be supplied to the disk playback unit 3. Receiving the control signal, the disk display unit 3 makes an access to a program in an optical disk 1 currently undergoing a playback operation. The system controller 51 also supplies a control signal to the disk replacing unit 4, requesting the disk replacing unit 4 to replace the current optical disk 1 with another one.

Reference numeral 7 is the signal processing unit which comprises an RF circuit 71, a decoder 72, a memory unit 73, an ADPCM decoder 74, a D/A Converter 75 and a low-pass filter (LPF) 76. A output signal by a detector employed in the optical head 33 is supplied to the RF circuit 71. Based on the output signal by the detector of the optical head 33, the RF circuit 71 generates a playback signal and signals representing focusing and tracking errors. The focusing and tracking error signals generated by the RF circuit 71 are supplied to the servo circuit 52 described above whereas the playback signal is supplied to the decoder 72. The decoder 72 extracts address data and catalogue information from the playback signal and carries out signal processings such as EFM demodulation and error correction on the playback signal. The address data and catalogue information pertaining to the optical disk 1 extracted by the decoder 72 are supplied to the system controller 51 and used thereby for generating control signals. The control signals are, in turn, used for controlling an operation to access a program of the optical disk 1 and an operation to replace the optical disk 1 with another one. The catalogue information pertaining to the optical disk 1 is also stored in a memory area in the system controller 51.

Digital data output by the decoder 72 is supplied to the memory unit 73 to be temporarily stored therein. A typical example of the memory unit 73 is a Random-Access Memory (RAM) unit with a storage capacity of 4 Mbits. The digital data output by the decoder 72 is written into the memory unit 73 under the control of the system controller 51 at a typical transfer rate of 1.41 Mbit/sec. The digital data temporarily stored in the memory unit 73 is then read back also under the control of the system controller 51 at a transfer rate of, for example, 0.3 Mbit/sec. As such, the operations to write and read back the digital data are controlled by the system controller 51. The digital data is finally converted into a playback signal appearing at an output terminal through the LPF 76. The memory unit 73 can accommodate digital data which corresponds to such a playback signal of about 12 seconds in length. Since digital data is written into the memory unit 73 at a speed higher than the transfer rate at which the digital data is read back therefrom as described above, the memory unit 73 is always in a state of holding a predetermined amount of digital data. As a result, even in the event of a track jump caused by an external shock given to the optical disk 1 in the course of a playback operation, the generation of the playback signal is not interrupted because the playback signal is converted from digital data read out from the memory unit 73. While digital data is being read out from the memory unit 73, the optical head 33 accesses the optical disk 1, generating a signal therefrom. In this way, even in the event of a track jump, a playback operation can be implemented to continuously produce a playback signal like that of an ordinary playback operation.

Digital data read out from the memory unit 73 is supplied to the ADPCM decoder 74 to undergo ADPCM decoder processing before being fed to the D/A converter 75 for converting the digital data into an analog signal which is finally transmitted as a playback to the output terminal through the LPF 76 as described above. The ADPCM 74 is also driven by a control signal output by the system controller 51.

It should be noted that the memory unit 73 must have such a minimum storage capacity that the memory unit 73 can at least accommodate digital data which will not run out in a continuous reading operation carried out during a time required for replacing an optical disk 1 with another one.

The playback operation of the disk playback apparatus equipped with a disk replacing facility in the configuration described above is explained as follows.

First of all, the user mounts a disk magazine 21 on the disk mounting unit 2. Based on a signal received from the operation input unit 61, the system controller 51 generates a control signal output to the changer mechanism 41 of the disk replacing unit 4. Receiving the control signal, the conveying mechanism of the changer mechanism 41 moves the drawing mechanism to the position on the disk magazine 21 at which a specified optical disk 1 is accommodated. The drawing mechanism is then operated to pull the specified optical disk 1 out of the disk magazine 21. Subsequently, the conveying mechanism is operated to take the optical disk 1 pulled out from the disk magazine 21 to the disk playback unit 3 along with the drawing mechanism and place the optical disk 1 on the disk table of the disk-rotation driving mechanism 31. A control signal is supplied to the disk playback unit 3 from the system controller 51. Receiving the control signal, the spindle motor 32 of the disk playback unit 3 is driven to rotate the optical disk 1 placed on the disk table. As the optical disk 1 starts to rotate, a leading-in operation is commenced on the focusing servo. As the leading-in operation of the focusing servo is completed, a leading-in operation of the tracking servo is started. The RF circuit 71 generates signals representing focusing and tracking errors based on a output signal by the detector employed in the optical head 33. The focusing and tracking error signals are supplied to the servo circuit 52. The servo circuit 52, in turn, generates focusing and tracking servo signals supplied to the actuator of the optical head 33 in order to implement focusing and tracking servos. As such, the focusing and tracking servos are based on the focusing and tracking servo signals. As the leading-in operation of the tracking servo is completed, a playback signal output by the RF circuit 71 is supplied to the decoder 72 wherein catalogue information and address data of the optical disk 1 are extracted from the playback signal and supplied to the system controller 51. The catalogue information of the optical disk 1 is stored in a memory area of the system controller 51. On the other hand, digital data output by the decoder 72 is written temporarily into the memory unit 73 at a transfer rate of 1.41 Mbit/sec. The digital data written into the memory unit 73 is then read back at a transfer rate of 0.3 Mbit/sec and supplied to the ADPCM decoder 74. The digital data undergoes an ADPCM decoding process in the ADPCM decoder 74. After undergoing the ADPCM decoding process in the ADPCM decoder 74, the digital data is supplied to the D/A converter 75 to be converted into an analog signal before finally sent to the output terminal through the LPF 76. The system controller 51 also supplies control signals to the display unit 62 for displaying the number of a program currently undergoing a playback operation, the number of the optical disk 1 of the program and a playback elapse time in addition to the catalogue information. On the other hand, the system controller 51 receives an input signal representing an operation carried out on the operation input unit 61. Based on this input signal, the system controller 51 moves the optical head 33 in the radial direction of the optical disk 1 and performs a playback operation on a plurality of programs recorded in the optical disk 1 on a selection basis.

The following is description of an operation to replace an optical disk 1 with another one with reference to a flowchart shown in FIG. 2. As shown in the figure, the flowchart begins with a step S1 to determine whether or not the end address of a last program in a playback order set in advance for a plurality of programs recorded in the optical disk 1 has been reached. The determination is done by the system controller 51 by comparing address data output by the decoder 72 to catalogue information stored in the memory area in the system controller 51. At the same time, the flow also goes to a step S2 to determine whether or not the optical head 33 has reached a position on the optical disk 1 corresponding to the end address of the last program recorded in the optical disk 1. The determination is also done by the system controller 51 by comparing address data output by the decoder 72 to catalogue information stored in the memory area in the system controller 51. If the end address has not been reached or the optical head 33 has not been at the end address, the playback operation is continued. If the end address has been reached or the system controller 51 verifies that the optical disk 33 has been positioned at the end address, on the other hand, the flow continues to a step S3 at which the playback operation carried out by the disk playback unit 3 is halted. In addition, the changer mechanism 41 of the disk replacing unit 4 is operated immediately to return the optical disk 1 from the disk playback unit 3 to the disk magazine 21. Then, the disk replacing unit 4 pulls out another optical disk 1 to undergo a playback operation next from the disk magazine 21 and mounts the optical disk 1 on the disk playback unit 3. In the mean time, digital data stored in the memory unit 73 is supplied to the ADPCM decoder 74 and the subsequent circuits to sustain the feeding of the playback signal to the output terminal. The flow then continues to a step S4 at which the rotation of the spindle motor 32 of the disk playback unit 3 is started as soon as the new optical disk 1 pulled out from the disk magazine 21 is mounted on the disk playback unit 3. At the same time, operations to start up the disk playback unit 3 such as the leading-in operations of the focusing and tracking servos are carried out. Then, the flow continues to the next step S5 at which the playback operation is performed by the disk playback unit 3 as described earlier upon the completion of the operations to start up the disk playback unit 3. This sequence of playback operations on the optical disk 1 and operations to replace it with another one are terminated when a playback order of programs set in advance by pressing keys of the operation input unit 61 is completed. The playback operation is also terminated immediately at the time the stop key on the operation input unit 61 is pressed.

FIG. 3 is a flowchart used for explaining an operation to reproduce head information of each program for a predetermined period of time from an optical disk 1 for recording a plurality of such programs. After the disk magazine 21 for accommodating the optical disks 1 has been mounted on the disk mounting unit 2, an optical disk 1 is always pulled out from the disk magazine 21 and mounted on the disk playback unit 3.

Here, assume that a mode is set in advance by manipulating the operation input unit 61 to reproduce head information of each program for a predetermined period of time from optical disks 1 each for recording a plurality of such programs.

First of all, the flow begins with a step S10 at which the disk replacing unit 4 is operated as soon as the disk magazine 21 is mounted on the disk mounting unit 2. An optical disk 1 specified by an order set in advance by the operation input unit 61, or the first optical disk 1, is then pulled out from the disk magazine 21. A detecting switch is installed in the disk mounting unit 2 for detecting the disk magazine 21 being mounted on the disk mounting unit 2. The detecting switch is actuated by the operation of mounting the disk magazine 21 on the disk mounting unit 2. A signal representing the state of the detecting switch is supplied to the system controller 51.

The flow then goes to the following step S11 at which, much like the flowchart shown in FIG. 2, the rotation of the spindle motor 32 of the disk playback unit 3 is started by a control signal supplied thereto as soon as the new optical disk 1 pulled out from the disk magazine 21 is mounted on the disk playback unit 3. As the rotation of the optical disk 1 is started by the spindle motor 32, operations to start up the disk playback unit 3 such as the leading-in operations of the focusing and tracking servos are carried out.

The flow then continues to a step S12 at which catalogue information of the optical disk 1 is read out and stored in the memory area in the system controller 51 upon the completion of the operations to start up the disk playback unit 3. Subsequently, the flow goes to the following step S13 at which an operation to read out a program from the optical disk 1 is started at the end of the operation to read out the catalogue information.

The flow then continues to the next step S14 to let the system controller 51 examine whether or not the optical head 33 has reached an address location separated from the start address of the program by a distance corresponding to the predetermined period of time or reached the predetermined address location. The start address of the program is known because it has been stored in the memory area of the system controller 51 as part of the catalogue information of the optical disk 1 at the step S12 described above.

The predetermined time corresponding to the distance from the start address to the address location or the time required by the optical head 33 to reach the predetermined address location corresponds to the time required to replace an optical disk 1 with another one. As an alternative, the period of time is set at such a value that allows the user to identify a program in question recorded in the optical disk 1 within the period of time by listening to the head information. The time is typically greater than 10 seconds in length.

The detection of the optical head 33 having reached the address location separated from the start address of the program by a distance corresponding to the predetermined period of time or having reached the predetermined address location is based on address data output by the decoder 72. At the time the optical head 33 reaches the address location, the flow goes to a step S15 at which the system controller 51 generates a control signal for moving the optical head 33 to a position on the optical disk 1 corresponding to the start address of the next program. These operations carried out at the steps S13, S14 and S15 are repeated until the optical head 33 reaches the end address of the optical disk 1. In the meantime, digital data read out from the memory unit 73 is transmitted continuously as a playback signal to the output terminal through the ADPCM decoder 74 and other circuits without interruption.

Following the step S15, the flow goes to a step S16 to let the system controller 51 determine whether or not the optical head 33 has reached the end address of the optical disk 1 by monitoring the address data supplied thereto by the decoder 72. If the system controller 51 finds at the step S16 that the optical head 33 has reached the end address of the optical disk 1, the flow goes to a step S17 at which the playback operation by the disk playback unit 3 on the optical disk 1 is immediately terminated and the disk replacing unit 4 is operated for replacing the optical disk 1 with another one.

As the replacement of the optical disk 1 is completed, the flow returns to the step S10 at which the procedure described above is repeated by again starting a playback operation on the replacement optical disk 1 which has just been mounted on the disk playback unit 3. As described earlier, while the optical disk 1 is being replaced with another one, digital data stored in the memory unit 73 is continuously supplied to the ADPCM decoder 74 and the subsequent circuits to sustain the feeding of the playback signal to the output terminal. The operations to playback the head portion of each program in order only for a predetermined period of time are terminated at the time all optical disks 1 accommodated in the disk magazine 21 have been played back or at the time an operation canceling key such as the stop key on the operation input unit 61 is pressed.

In the embodiment described above, optical disks 1 are accommodated in the disk magazine 21. It should be noted, however, that each optical disk 1 can also be put in a disk cartridge as well. In this case, a disk magazine that can accommodate a plurality of cartridges is employed. As an alternative, the disk mounting unit 2 is designed so that a plurality of disk cartridges can be accommodated. In this way, the operations described above can also be implemented as well. Moreover, the recording media are not limited to disks such as the optical disks. The present invention can also be applied to a playback apparatus employing a magazine accommodating a plurality of tape cassettes each containing a tape recording medium. Modifications in a range not much deviating from the gists of the present invention can also be implemented as well.

Although the present invention has been shown and described with respect to preferred embodiments, various changes and modifications which are obvious to a person skilled in the art to which the invention pertains are deemed to lie within the spirit and scope of the invention as claimed.

What is claimed is:

1. A continuous-playback method for continuously playing back a plurality of recording media each containing a plurality of recorded digital information signals corresponding to a plurality of recorded programs, table-of-contents information (TOC), and address information comprising the steps of:

(a) operating a recording media magazine apparatus to selectively fetch a recording medium from among the plurality of recording media;

(b) reading the TOC information, a digital information signal corresponding to a selected program, and the address information recorded in the selectively fetched recording medium;

(c) temporarily storing the digital information signal read from the selectively fetched recording medium in a storage means;

(d) audibly reproducing the digital information signal stored in the storage means while comparing the address information read from the selectively fetched recording medium to both a predetermined address corresponding to a predetermined time, the predetermined time corresponding to a time which is less than is required to reproduce the selected program from a start address for the selected program derived from the TOC information, and an end address of the recording medium which is derived from the TOC information; and (i) if the address information is equal to the predetermined address, stopping audible reproduction of the digital information signal stored in the storage means, reading a different digital information signal and address information from the fetched recording medium corresponding to a second selected program, and repeating steps (c) and (d); and (ii) if the address information read from the selectively fetched recording medium is equal to the end address, controlling the recording media magazine apparatus to replace the recording medium with another recording medium while continuously outputting data from the storage means and audibly reproducing the output data while the recording medium is being replaced with another recording medium.

2. A continuous-playback method according to claim 1 further comprising the steps of:

writing said digital information signal read from the selectively fetched recording medium into said storage means at a write speed higher than a read speed at which said digital information signal is read back from said storage means.

3. A recording-medium reproducing apparatus with a replacing function for replacing a recording medium with another recording medium, the apparatus comprising:

a replacing means for selectively fetching a recording medium from a recording-medium accommodating unit for accommodating a plurality of recording media each having a digital information signal and address information recorded therein;

a reading means for reading the digital information signal from the fetched recording medium;

a memory for temporarily storing the digital information signal read and supplied by the reading means, wherein the digital information signal is written into the memory at a write transfer rate higher than a read-out transfer rate at which the digital information signal is read out therefrom;

a recording-medium reproducing unit for performing predetermined signal processing on the digital information signal read-out from the memory and outputting a result of the predetermined signal processing as a reproducing signal from the fetched recording medium, the recording-medium reproducing unit including a decoding means for extracting address information out of the digital information signal output from the reading means; and a control means for controlling the recording-medium reproducing unit so that the recording medium reproducing unit reproduces the fetched recording medium for a predetermined period of reproducing time which is less than a time required to fully reproduce a selected program on the disk and is at least as long as a time required to disengage the reading means, to replace by the replacing means the fetched recording medium with another recording medium, and to reengage the reading means, and for allowing the digital information signal to be reproduced continuously from the memory while the replacing means is performing an operation to replace the fetched recording medium with another recording medium, wherein the address information output from the decoding means is supplied to the control means and when the address information supplied by the decoding means reaches a predetermined end address which corresponds to the predetermined period of reproducing time, the control means outputs a control signal to the replacing means, the control means requesting the replacing means to perform an operation to replace the fetched recording medium with another recording medium while the digital information signal is being read out from the memory.

4. A continuous reproducing method using a plurality of recording media for continuously reproducing the plurality of recording media on each of which is recorded a plurality of information signals and address information, said method comprising steps of:

selecting and extracting, by a replacing means, a recording medium from a container that contains the plurality of recording media;

reading and reproducing, by a reproducing means, one of the information signals and the address information from the extracted recording medium;

storing, in a storing means, the address information and temporarily storing the information signal supplied from the extracted recording medium by said reading means; and comparing the address information read out from the extracted recording medium to an end address, if a reproducing time from a start point of the information signal is a predetermined time according to the address information when one of information signal is read out and reproduced from the extracted recording medium, wherein said predetermined time is less than a time required to fully reproduce a selected program on the disk and is at least as long as a time required to disengage said reading means, to replace by said replacing means said fetched recording medium with another recording medium, and to reengage said reading means, controlling said reproducing means to access, read out, and reproduce another information signal according to the address information, and if the address information readout from the extracted recording medium is equal to the end address, controlling said replacing means to replace the recording medium with another recording medium and continuously output data from said storing means while the recording medium is replaced with the another recording medium.

* * * * *